PARTY LINE METERING SYSTEM

Filed Oct. 23, 1950 3 Sheets-Sheet 1

INVENTOR.
CLARENCE E. LOMAX

BY *Wm. Walter Owen*

ATTORNEY

Dec. 30, 1952 C. E. LOMAX 2,623,937

PARTY LINE METERING SYSTEM

Filed Oct. 23, 1950 3 Sheets-Sheet 2

INVENTOR.
CLARENCE E. LOMAX

BY McWalter Owen

ATTORNEY

INVENTOR.
CLARENCE E. LOMAX
BY Wm. Walter Owen
ATTORNEY

Patented Dec. 30, 1952 2,623,937

UNITED STATES PATENT OFFICE 2,623,937

PARTY LINE METERING SYSTEM

Clarence E. Lomax, Chicago, Ill., assignor to Automatic Electric Laboratories, Inc., Chicago, Ill., a corporation of Delaware Application October 23, 1950, Serial No. 191,558

1 Claim. (Cl. 177—351)

The present invention relates to apparatus for metering a telephone call received from a subscriber on a multi-party line. More particularly, it relates to apparatus located in proximity to the subscriber's telephone for metering calls made by him and also to apparatus for determining the reading of the meter from a remote point.

It is an object of the invention to provide a party line metering arrangement in which the meter is located at the party line station.

Another object of the invention is to provide an arrangement whereby telephone and other meters located at a subscriber's station may be read from a remote point.

Another object is to provide a telephone meter at a subscriber's station which is operated by momentarily applying a high potential to the line when the called party answers.

Another object is to provide apparatus whereby gas and electric meters located at a subscriber's station can be read over telephone wires.

A further object is to provide a party line metering circuit in which the meter is normally insulated from the line through a neon lamp.

A still further object of the invention is to provide a party line metering circuit which operates the meter when the called party answers without any action on the part of the caller, and in which the metering is repeated for long conversations.

Another object is to provide party line metering in which a meter located at a subscriber's station is controlled from the trunk circuit.

Figure 1:
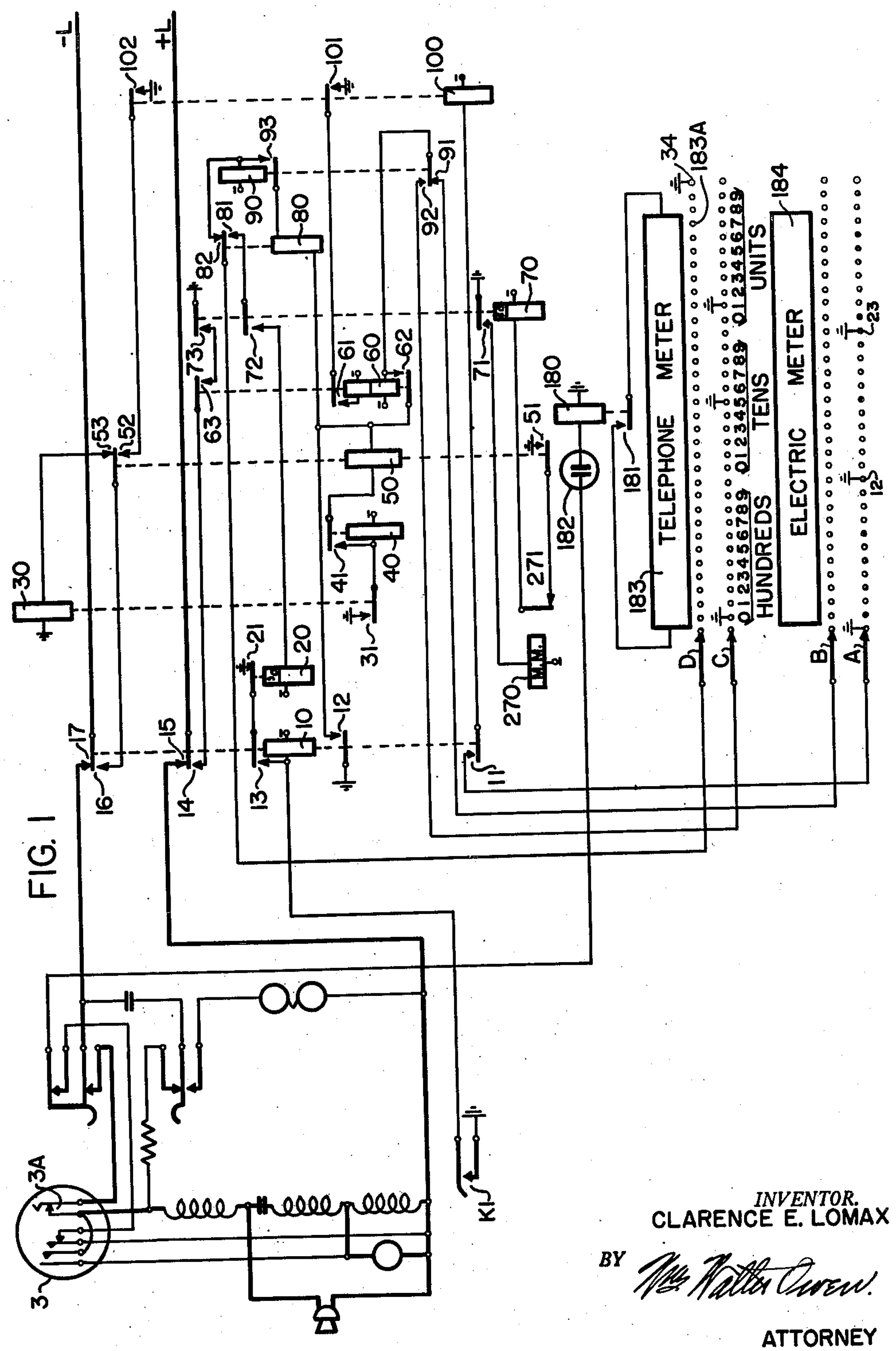
Figure 2:
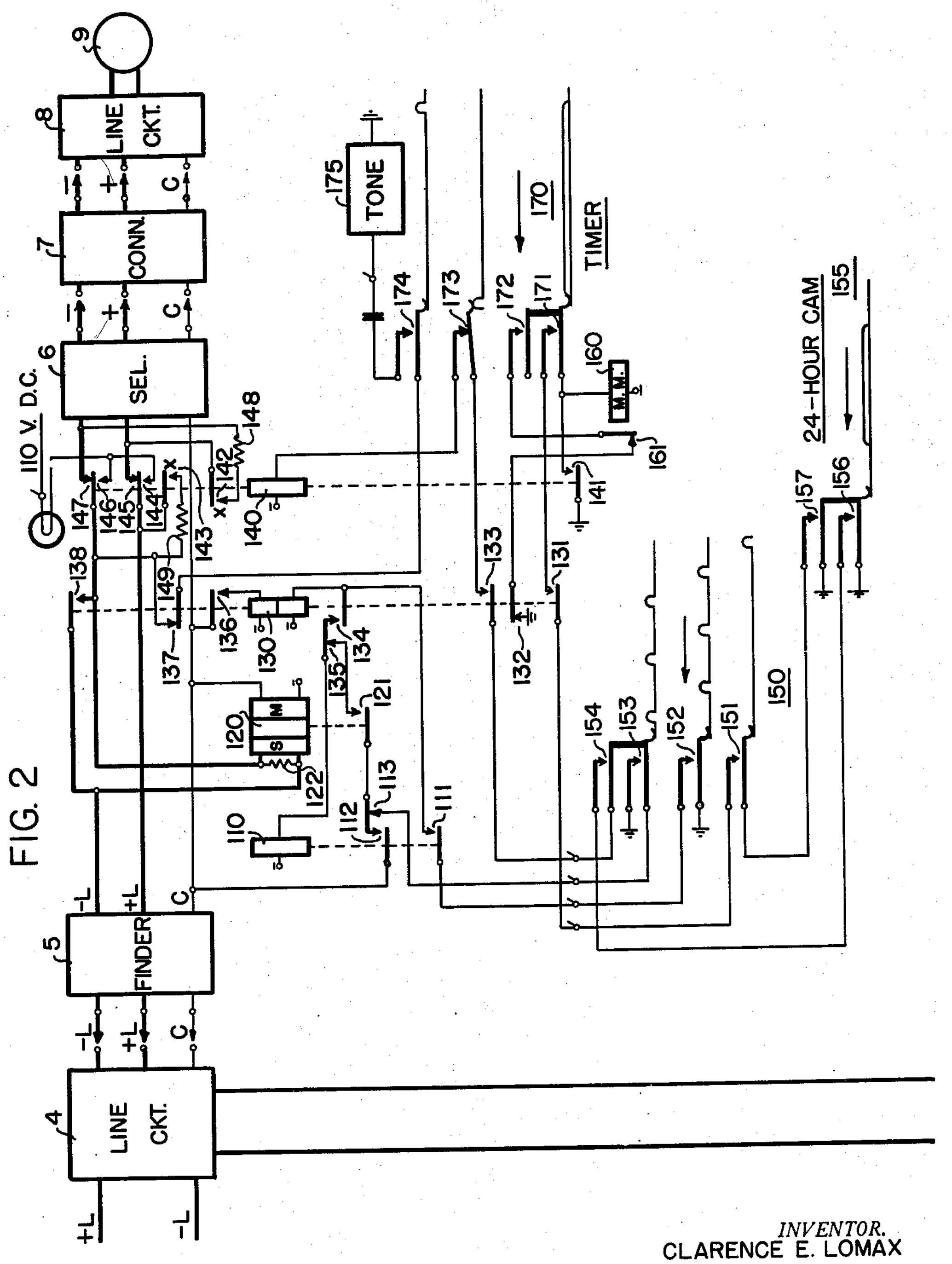
Figures 3, 4:
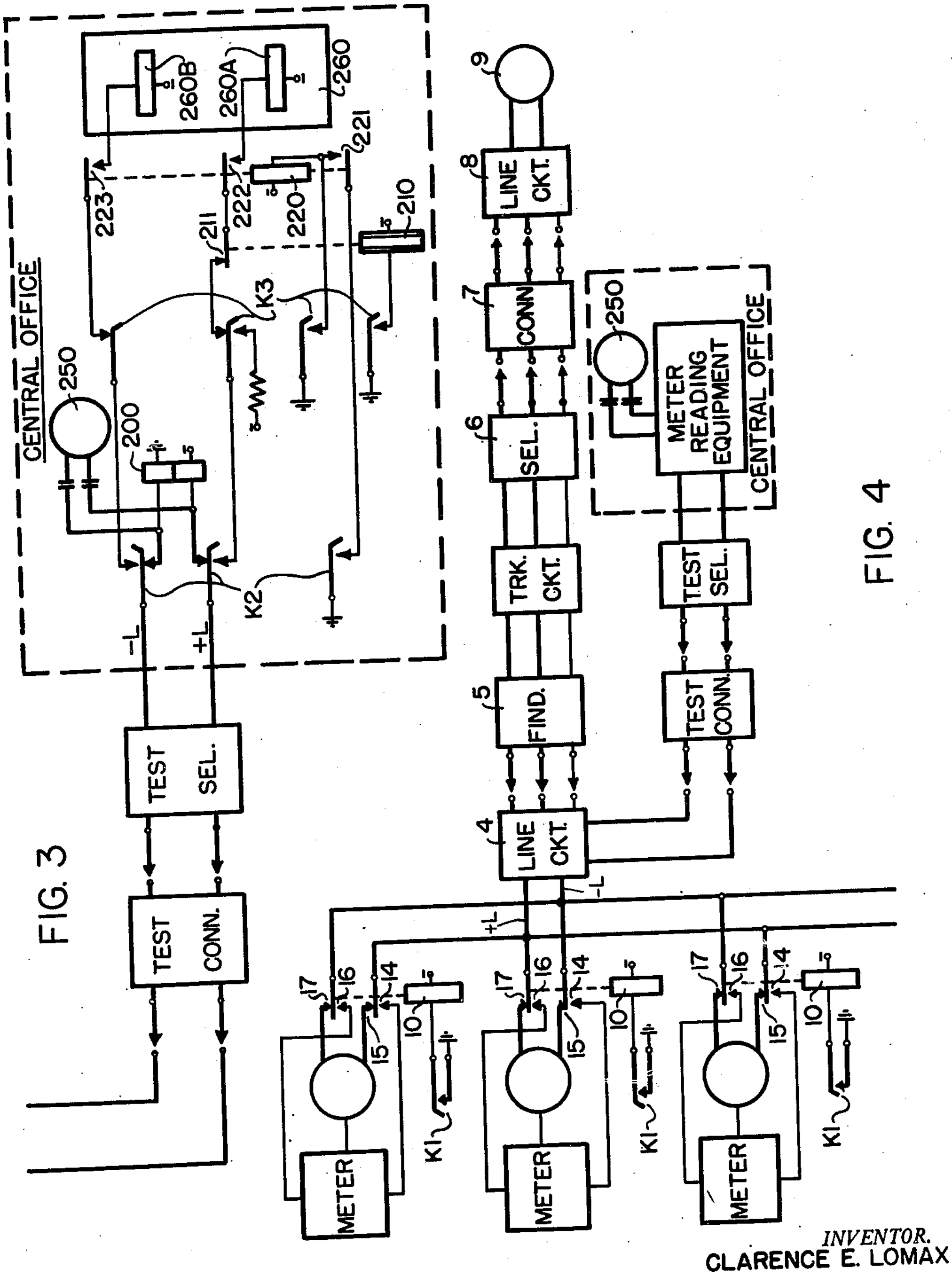

The invention, both as to its organization and method of operation, together with further objects, will best be understood by referring to the following specification taken in connection with the accompanying drawings, in which Figs. 1 and 2, when placed side by side with Fig. 1 at the left, illustrate diagrammatically the metering apparatus of this invention. Fig. 4 illustrates in block form the apparatus of this invention.

Referring to Fig. 4 a group of party line telephone stations are shown at the left connected to a pair of line leads —L and +L. Each telephone station includes a dial, a metering device, and a switching relay 10 controlled by a manual switch K1. The relay 10 serves to switch the line leads —L and +L from the telephone instrument to the metering device. The metering device and the dial are the same as those shown at 183 and 3 in Fig. 1.

The line leads are connected to the usual switch train comprising a line circuit 4, a finder 5, a selector 6, a connector 7, and a line circuit 8 to a called telephone 9.

The trunk circuit shown between the finder 5 and selector 6 contains equipment which will operate the metering device 183 when the called party at the telephone 9 answers. The meter reading equipment shown connected to the line leads contains a recording device as well as manual switches to control the remote recording of the reading on the metering device 183. The operation of the trunk circuit and meter reading equipment will now be described in more detail.

In Fig. 1 a typical subscriber's telephone is indicated by a dial 3 which sends out digit pulses. The dial 3 is standard in every respect except that it has a set of springs 3A added in order to serve the meter 180. The digit pulses are transmitted through a pair of line leads —L and +L with the help of a control lead C to a standard finder 5.

The pulses sent out by the dial 3 then operate a standard selector 6 and a standard connector 7 which then connects the call through a line circuit 8 to a subscriber 9.

When the subscriber 9 answers, a high potential is momentarily applied to the line and this results in the operation of a meter relay 180 through a neon tube 182 which has been made to conduct by the momentary application of the high potential. The operation of the meter relay 180, which may be a standard type of relay, closes its contacts 181 to advance a metering device 183. The metering device 183 is normally located at the subscriber's station but it need not be near the telephone instrument. For the sake of simplicity a single subscriber 3 is shown in Fig. 1 connected to the line leads —L and +L. However, any number of other subscribers may be connected in parallel to the line. Each additional subscriber would have his own meter relay 180 and metering device recorder 183. The apparatus for reading the metering device 183 from a remote point such as a central office is shown in Fig. 2 and will be more fully explained hereinafter.

The apparatus for operating the meter relay 180 is shown in Fig. 1 and will now be described in detail.

A call is initiated by removing the receiver and this causes the line equipment 4 and the finder 5 to function in the usual manner. The extension of the call by the finder 5 grounds the C conductor in the usual manner and this supplies current to the M winding of a shunt field relay 120. The S winding of the relay 120 is in series with the line but the two windings are so poled that the relay 120 does not operate. The relay 120 is operated from reverse current from the connector 7 when the party 9 answers the call. The relay 120 closes its contacts 121 to prepare the following circuit for the operation of a relay 110 at the time a cam set 150 advances to close its contacts 153: ground, contacts 153, 113, 121, 135, relay 110, and battery to ground.

The cam set 150, which is located in the central office is in constant operation. A single cam set may be used to control the operation of a large number of meters. A 24-hour cam 155 furnishes ground through its contacts 156 to activate the cam set 150. During slack periods of the day the 24-hour cam 155 is arranged to open its contacts 156 to prevent metering from taking place.

The operation of the relay 110 closes its contacts 111 to prepare the following circuit for the operation of a relay 130 when the cam set 150 closes its contacts 152: ground, contacts 152 and 111, relay 130 and battery to ground.

The operation of the relay 130 closes its contacts 133 which prepares a circuit for the operation of a relay 140 when the cam set 150 advances to close its contacts 153 and at a time when the 24-hour cam 155 has advanced to close its contacts 156. When the relay 140 operates it first closes its "x" contacts 142 and 143 to bridge a pair of resistance coils 148 and 149 across the line trunks −L and +L.

It then closes its contacts 144 and 146 and opens contacts 145 and 147 to open the trunk circuit and apply a high potential direct current, which is the 110 v. source shown, to both sides of the incoming trunk. This high potential direct current ionizes a neon tube 182 at the calling subscriber's station and thus energizes the meter relay 180.

The resistance coils 148 and 149 across the trunk hold the switch train when the relay 140 opens the trunk circuit and reduce the receiver noise at the calling station as the relay 140 removes and then replaces the line battery which is normally furnished from the switch train. The length of time the contacts 154 are closed determines the length of time the high voltage direct current will have to operate the meter relay 180. The pulses through the contacts 153 and 151 must be sufficiently far apart to prevent the relay 130 from operating prematurely due to the relay 120 responding falsely to pulses or to ringing current. The pulses through the contacts 154 are sent immediately after the pulses through the contacts 152 in order to meter as quickly as possible after the relay 130 has been energized. If the pulses through the contacts 153 are sent just before the relay 120 is operated by the answering party, the maximum delay period will be had in metering. However, this maximum delay is of very short duration and causes no annoyance.

When the relay 140 is energized it closes its contacts 141 to complete a circuit to the motor magnet 160 of a timer 170. The timer 170 is of the type which advances a step when its circuit is opened. Thus, when the relay 140 restores (which occurs when the contacts are opened) the timer 170 is advanced a step. After the cams of the timer 170 have advanced the contacts 173 are opened so that the relay 140 can no longer respond to the pulses sent out by the cam set 150. As soon as the timer 170 has operated, its contacts 171 and 172 are closed to prepare a circuit through a contact 151 of cam set 150 for the further operation of the motor magnet 160.

It has been previously stated that the cams of the set 150 are in continuous operation. After the contacts 151 are momentarily closed, the timer 170 is advanced in a step-by-step manner. The cam set 150 closes the contacts 151 once per revolution while the contacts 152, 153, and 154 are closed three times per revolution. This arrangement enables the contacts 152, 153, and 154 to be closed frequently so as not to delay the operation of the meter relay 180. But the contacts 151 are closed only once per revolution in order to avoid having the conversation timer take so many steps to measure the allowable length of conversation.

When the conversation timer has made almost a complete revolution its contacts 174 close to place a warning tone from a tone source 175 to warn the parties that metering is about to be repeated. This tone is timed so as to be very near the re-metering period so that the subscribers may terminate their conversation.

As the conversation continues, the contacts 173, and then contacts 171 and 172 will be closed at the end of the revolution. The closing of the contacts 173 will allow the relay 140 to be operated again for metering. Thus, pulses for re-metering may be received again and again for a long conversation.

When the relay 130 operates it closes its contacts 138 to shunt the S winding of the relay 120 so that the high-voltage direct current is placed on the line. As a result of the operation of the relay 140 the high voltage current flow will not take place through the S winding. This high-voltage direct current source is connected to ground but it is not material whether it is the negative or the positive side that is grounded. It may be so connected that its current will cause the relay 120 to restore but this is of no consequence because the relay 130 is operated. By shunting the S winding in the manner explained above, a loss in meter current is avoided and receiver noises and transmission loss are reduced.

The relay 130 locks to the C conductor through its contacts 136. When the switch train is released it removes ground from conductor C and this allows the relay 130 to restore. The restoration of the relay 130 opens its contacts 131 to prevent further pulses from going to the timer magnet 160. The closing of the contacts 132 completes an interrupter circuit through the contacts 172 and 161 to return the magnet 160 to its normal position.

The speed of rotation of the cam set 150 and the number of steps required by the timer 170 to make a complete revolution determines the length of a metered conversation. The cam set 150 may be rotated constantly by a motor or may be moved by pulses from a magnet. In either case, the speed of rotation may be changed so that rotation is fast during the busy portion of the day and slower at less busy portions of the day. The 24-hour cam 155 has to have its contacts 156 and 157 closed in order for metering to take place. During the night the 24-hour cam 155 may have its contacts 156 and 157 opened so as to eliminate metering.

An incoming call to the telephone at the subscriber's station rings the bell in the usual manner but the ringing current cannot pass through the neon tube 182 to the meter relay 180, because the circuit is opened at the hook switch. As the receiver is removed to answer the call the meter will be connected to the line through the tube and if the ringing current is of high potential the tube 182 will flash. However, the fact that the current is alternating current of short duration and the fact that the meter relay 180 does not operate quickly will result in the meter not operating when the call is answered. If the called party flashes his hook after answering, the inductive kick from the answering bridge at the central office will apply high potential to the line. This would flash the lamp 182 if it weren't for the fact that the current is dissipated before the local switch springs again close.

It has been previously mentioned that the meter relay 180 may be a relay with contacts 181. Each time the relay 180 has energized, its contacts 181 close and a register meter such as the metering apparatus 183 shown in Fig. 1 is advanced to indicate that a call has been made. In order to provide for remote reading of the meter 183 it must have contacts over which a wiper passes to mark points indicating the amount of service which has been registered. A typical meter has units, tens, and hundreds contacts. Each time the contacts 181 close the meter is stepped 1 unit which is recorded on the meter by connecting ground to the proper one of the units contacts. For each tenth unit the tens contacts are controlled in the same manner. For each tenth step of the tens contacts the hundreds contacts are controlled in the same manner. Such a device can register up to 999 calls. The contacts for the meter 183 are indicated at 183A.

The circuit for the remote reading of the meter is shown in Fig. 3 and will now be described in detail.

When the time arrives for reading meters, an employee of the telephone company calls the subscriber over a switch train from a central office telephone instrument such as is indicated at 250 in Fig. 3. The switch train is preferably the conventional test train. The subscriber's bell is caused to ring in the usual manner. And when the call is answered the subscriber is requested to press a button switch K1. This furnishes ground for the operation of a relay 10. After he has closed the switch K1 the subscriber may hang up as there is nothing more for him to do. When the relay 10 is energized it locks to ground through the contacts 21 of a slow-to-operate relay 20. The relay 10 closes its contacts 11 to complete an obvious circuit for the operation of a relay 100. It closes its contacts 14 and 16 to disconnect the subscriber's telephone from the line and the contacts 16 connect a relay 30 to the +L lead coming from the central office. The meter reader at the telephone 250 now closes a manual switch K2 which disconnects a relay 200 from the line conductor −L. The operator then momentarily operates a manual switch K3 which opens the line circuit and places a current source on the +L lead to operate the relay 30. It also furnishes ground for the operation of a relay 220, which locks to the K2 switch through its contacts 221. Operation of the K3 switch also operation a slow-release relay 210.

The meter reader restores the K3 switch and this lets the relays 30 and 210 restore but the relay 30 restores first since the relay 210 is slow-to-release. During the time it operated the relay 30 closed its contacts 31 to operate a relay 40 which then closed its contacts 41 to prepare a circuit for the operation of a relay 50. When the relay 30 restores it opens the contacts 31 to remove a shunt which prevented the relay 50 from operating. Thereafter, the relays 40 and 50 operate in series from ground through the contacts 12. The relay 50 closes its contacts 52 to switch the +L lead so that it can later receive pulses from a relay 100.

The central office equipment which records the meter reading is indicated at 260. This may be a pen or punch register.

The meter reading can also be set up on type wheels and printed.

When the relay 50 operates it closes its contacts 51 to complete an obvious circuit for a slow-to-operate relay 70. The operation of the relay 70 completes a circuit through its contacts 71 to a motor magnet 270 associated with the meter recorder 183. The motor magnet 270 is of the type which advances upon the opening of the magnet circuit. As the motor magnet 270 operates it opens the circuit at the contacts 271 to let the relay 70 restore. When the relay 70 restores it opens its contacts 71 whereupon the motor magnet 270 steps and closes its contacts 271. This re-creates the energizing circuit for the relay 70 which thereupon operates and closes its contacts 71 to complete a circuit to the motor magnet 270 again. This cycle is repeated a number of times during which the motor magnet 270 steps its wipers. As soon as the wiper passes over a ground contact a circuit is completed through the contacts 11 for the energization of the relay 100. In the embodiment illustrated there is provided a means for reading both an electric meter and a telephone meter. The electric meter shown at 184 may be of the standard type used in homes except that it must have contacts over which a wiper passes to mark points indicating the amount of electric power consumed. The motor magnet 270 has a plurality of wipers A, B, C, and D which rotate in unison during the recording period.

The first rotation of the wipers reads the electric meter 184 since the relay 90 is not as yet energized. The reading of the electric meter will not be described in detail because it is exactly the same as the reading of the telephone meter, the operation of which will now be described in detail.

When the electric meter has been read and when the wipers reach the last position the wiper D passes over ground on contact 34 and this completes a circuit for the operation of a relay 90. Operation of the relay 90 closes its contacts 93 to prepare a circuit for the operation of a relay 80 in series with the relay 90. However, relay 80 is not energized at this time as ground through the D wiper acts as a shunt. The next step of the D wiper removes this shunt and the relay 80 operates in series with the relay 90.

The wipers are now in the home position and the contacts 92 have closed to prepare the circuit for reading the telephone meter. Ground from the wiper A again causes the relay 100 to operate momentarily and this relay closes its contacts 102 to complete a circuit for the operation of a recording magnet 260A located in the central office. The marking which is done by the magnet 260A can be read to indicate the start of the reading of the telephone meter 183. The wipers continue to rotate but now the wiper C is being read instead of the wiper B.

In the embodiment illustrated the contacts of the wiper C are shown as being grounded for the digit reading 051 which would correspond to 51 calls. If this is a new installation this meter reading indicates 51 calls for the month. However, if it is an old installation the 0 in the registration may have a different meaning and this is determined by making a comparison with the last reading. When the wipers leave the home position and reach the number 2 contacts, which is 0 in the hundreds group, the C wiper encounters ground. This causes a relay 60 to operate and it then locks to ground through its contacts 62 and the contacts 12. The relay 70 is restored in the manner previously outlined when the wiper C advances to the second contact, so that the recording magnet 260B does not immediately receive a pulse. However, when the relay 70 again operates to advance the wipers it closes its contacts 73 to step a magnet 260B by the following circuit: ground, contacts 73, 63, 14, switches K2 and K3, contacts 223, magnet 260B and battery to ground. These pulses continue to be sent to the magnet 260B until the wiper receives the pulse which advances it to contact 11. When the contact 11 is reached the wiper A encounters ground which operates the relay 100. The relay 100 then sends a pulse to the magnet 260A to indicate the end of a digit. It also closes its contacts 101 to place an opposing current in the relay 60 and cause it to restore. When the relay 70 is again operated to advance the wiper it does not pulse the magnet 260B because the relay 60 is restored.

The wiper C continues to advance but nothing happens until it encounters ground which is being furnished by the tens unit in the meter recorder 183. This ground is furnished at the digit 5 which is the contact 18. Ground at this contact causes the relay 60 to be energized again and the recording at the recorder 260 is then as before but in this case 5 pulses are recorded. When the A wiper reaches the grounded contact 23 it connects such ground for the operation of the relay 100 as before and this relay again closes its contacts 101 to restore the relay 60. The contacts 102 are closed to cause the magnet 260A to be stepped as before.

The C wiper now passes over the units digits and when it reaches the contact 25 ground is furnished which causes the relay 60 to operate thereby recording the digit 1 through the magnet 260B.

As the wipers reach contact 34 the D wiper furnishes ground to prepare a circuit for the operation of a slow-to-operate relay 20 by a circuit through contacts 81 and 72. However, the relay 20 does not operate immediately but must wait for the relay 70 to operate and close its contacts 72. When the relay 20 operates it opens its contacts 21 to break the holding circuit for the relay 10. The restoration of the relay 10 then lets all of the operated relays restore. The reading of the meters is now complete and the telephone is again connected to the line.

The power to operate the relays located at the subscriber's station is best provided by a source of direct current. This may be a battery or it may be a rectifier element operating from alternating current available at the subscriber's station.

While there has been described what is at present considered to be the preferred embodiment of the invention, it will be understood that various modifications may be made therein, and it is contemplated to cover in the appended claim all such modifications as fall within the true spirit and scope of the invention.

What is claimed is:

In a telephone system having a plurality of subscribers' stations and a plurality of meters at each station adapted to be read from a remote point over a line leading to said station, a switch at each station having a series of wipers, one for each meter, a series of contacts for each wiper having markings thereon indicating the units, tens, and hundreds digits representing the number of times that meter has been operated, a reproducing means at the remote station, control means at each station operated by each wiper of the switch at that station, means controlled from said remote point for connecting said reproducing means with the line of one station and for connecting the control means at that station with the line, and means controlled from the remote point over said line for causing operation of the switch at said station to move its wipers over its contacts repeatedly to thereby operate said control means in accordance with the markings on said contacts, and means also controlled over said line for connecting said line with first, the control means of one wiper and then with the control means of the other wiper, said control means operating said reproducing means over the line to reproduce all of the digits represented by the markings on said meter contacts.

CLARENCE E. LOMAX.

REFERENCES CITED

The following references are of record in the file of this patent:

UNITED STATES PATENTS

| Number | Name | Date |
|---|---|---|
| 2,035,358 | Yates | Mar. 24, 1936 |
| 2,141,463 | Dohl | Dec. 27, 1938 |